United States Patent [19]

Springer et al.

[11] Patent Number: 4,885,385
[45] Date of Patent: Dec. 5, 1989

[54] SULFONYL CONTAINING COMPOUNDS SUITABLE AS PRECURORS FOR WATER-SOLUBLE FIBER-REACTIVE TRIPHENDIOXAZINE COMPOUNDS

[75] Inventors: Hartmut Springer, Königstein/Taunus; Walter Helmling, Hofheim am Taunus; Günther Schwaiger, Frankfurt am Main, all of Fed. Rep. of Germany

[73] Assignee: Hoechst Aktiengesellschaft, Frankfurt am Main, Fed. Rep. of Germany

[21] Appl. No.: 225,545

[22] Filed: Jul. 28, 1988

Related U.S. Application Data

[62] Division of Ser. No. 13,974, Feb. 12, 1987, Pat. No. 4,774,333.

[30] Foreign Application Priority Data

Aug. 19, 1986 [DE] Fed. Rep. of Germany ....... 3628084

[51] Int. Cl.$^4$ ................. C07C 147/11; C07C 147/12; C07C 147/13
[52] U.S. Cl. .................................. 562/430; 544/377; 544/400; 558/22; 558/30; 558/172; 560/251; 560/252; 560/310; 562/427
[58] Field of Search .............. 562/427, 430; 560/251, 560/252, 310; 558/22, 30, 172; 544/337, 400; 260/507 R

[56] References Cited

U.S. PATENT DOCUMENTS

| | | | |
|---|---|---|---|
| 4,577,015 | 3/1986 | Jäger et al. | 544/76 |
| 4,578,461 | 3/1986 | Jäger | 544/76 |
| 4,621,138 | 11/1986 | Jäger et al. | 544/76 |
| 4,629,788 | 12/1986 | Jäger | 544/76 |
| 4,665,179 | 5/1987 | Wunderlich et al. | 544/76 |

FOREIGN PATENT DOCUMENTS

| | | |
|---|---|---|
| 141996 | 5/1985 | European Pat. Off. |
| 168751 | 1/1986 | European Pat. Off. |

*Primary Examiner*—Richard L. Raymond

[57] ABSTRACT

Water-soluble triphendioxazine compounds having fiber-reactive dye properties conforming to the general formula

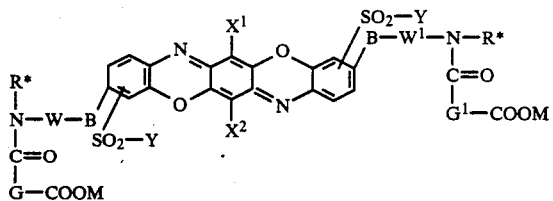

where:
B is —O— or —S— or —NH— or ($C_1$-$C_6$)-alkylamino;
R* is hydrogen or optionally substituted alkyl or aryl;
W and $W^1$ are each a bivalent, aliphatic or optionally alkyl-substituted cycloaliphatic or aliphatic-cycloaliphatic radical, which aliphatic radicals can be interrupted by —O—, —S—, sulfonyl, carbonyl, 1,4-piperidino, amino, alkylamino and/or alkanoylamino groups, or
the grouping —B—$W^1$—N(R*) and/or —N(R*)—W—B— each represent the bivalent radical of a five- or six-membered saturated heterocycle which contains two nitrogen atoms, or
the grouping —B—$W^1$— and/or —W—B— each represent the bivalent radical of a five- or six-membered saturated heterocycle which contains two nitrogen atoms and which is bonded by one of the two nitrogen atoms via an alkylene group of 2 to 4 carbon atoms to the grouping —N(R*)—CO—$G^1$— or —G—CO—A—N(R*);
G and $G^1$ are each a direct bond or a ($C_1$-$C_8$)-alkylene or aliphatic-cycloaliphatic or cycloaliphatic radical;
M is hydrogen, alkali metal or alkaline earth metal;
$X^1$ and $X^2$ are each hydrogen, halogen, alkyl, alkoxy, aryloxy or optionally substituted aryl;
Y is vinyl or ethyl having an alkali-eliminable substituent in the β-position,
and also precursors thereof, conforming to the general formula

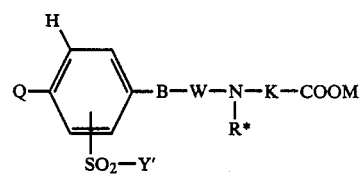

where Q is the nitro or amino group, B, R* and M have the above meanings, Y' has a meaning of Y or is equal to β-hydroxyethyl and K has the above meaning of G or, if Q is equal to $NO_2$, is also equal to alkenylene of 2 to 8 carbon atoms or alkdienylene of 4 to 8 carbon atoms.

The triphendioxazine compounds serve as dyes for dyeing carboxamido-containing fiber materials, in particular hydroxyl-containing fiber materials, such as cellulose; they produce strong, fast, blue dyeings.

11 Claims, No Drawings

SULFONYL CONTAINING COMPOUNDS SUITABLE AS PRECURORS FOR WATER-SOLUBLE FIBER-REACTIVE TRIPHENDIOXAZINE COMPOUNDS

This application is a division of our copending application Ser. No. 07/013,974, filed Feb. 12, 1987, now U.S. Pat. No. 4,774,333.

The present invention relates to the field of fiber-reactive dyes. European Patent Application Publications No. 0,141,996 A and No. 0,168,751 A describe some fiber-reactive triphendioxazine dyes with carboxamide groups, which, however, have properties in need of improvement.

We have now found novel water-soluble triphendioxazine compounds conforming to the general formula (1)

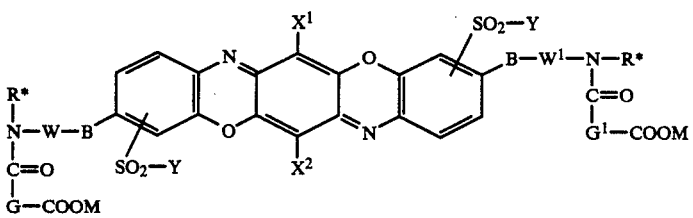

which have valuable fiber-reactive dye properties.

In this formula (1) the meanings are:

B is an oxygen or sulfur atom or an amino group of the formula —NH— or —N(R')—, in which R' is an alkyl group of 1 to 6 carbon atoms, preferably of 1 to 4 carbon atoms, such as the methyl or ethyl group;

R* is a hydrogen atom or an optionally substituted alkyl group of 1 to 4 carbon atoms or an optionally substituted aryl radical, such as, for example, methyl, ethyl, benzyl, phenethyl, $\beta$-sulfatoethyl, $\beta$-sulfoethyl, phenyl, sulfophenyl or sulfobenzyl;

W is a bivalent, aliphatic or optionally $C_1$–$C_4$-alkyl-substituted ($C_5$–$C_{10}$)-cycloaliphatic or optionally $C_1$–$C_4$-alkyl-substituted aliphatic-($C_5$–$C_8$)-cycloaliphatic radical, which aliphatic radicals can be interrupted by hetero groups, preferably 1 or 2 hetero groups, which are selected from the groups —O—, —S—, —SO$_2$—, —CO—, 1,4-piperidino, —NH— and —N(R°), in which R° has one of the meanings of R' or is an alkanoyl group of 2 to 5 carbon atoms, such as the acetyl group, and $W^1$ has one of the meanings indicated for W and is identical to or different from W, or the grouping —B—$W^1$—N(R*)— and the grouping —N(R*)—W—B—, identical to or different from each other, each represent together the bivalent radical of a five- or six-membered saturated heterocycle which contains two nitrogen atoms, or the grouping —B—$W^1$— and the grouping —W—B—, identical to or different from each other, each represent together the bivalent radical of a five- or six-membered saturated heterocycle which contains two nitrogen atoms and which is bonded by one of the two nitrogen atoms via an alkylene group of 2 to 4 carbon atoms to the grouping —N(R*)—CO—$G^1$— or —G—CO—A—N(R*)—;

G is a direct bond or a straight-chain or branched alkylene group of 1 to 8 carbon atoms, preferably of 2 to 6 carbon atoms, or an aliphatic-cycloaliphatic radical or a cycloaliphatic radical having in each case 5 to 8 carbon atoms, preferably 6 carbon atoms, in the cycloaliphatic;

$G^1$ has one of the meanings indicated for G and is identical to G or different from G;

M is a hydrogen atom or an alkali metal, such as sodium, potassium and lithium, or one equivalent of an alkaline earth metal, such as, for example, of calcium, but in particular an alkali metal;

$X^1$ is a hydrogen atom or a halogen atom, such as a chlorine or bromine atom, an alkyl group of 1 to 4 carbon atoms, an alkoxy group of 1 to 4 carbon atoms, an aryloxy group or an optionally substituted aryl radical;

$X^2$ is identical to or different from $X^1$ and has one of the meanings indicated for $X^1$;

Y is the vinyl group or an ethyl group which contains in the $\beta$-position an alkali-eliminable substituent;

the group —SO$_2$—Y is preferably bonded in the ortho-position relative to the radical B.

The individual formula member, including those which appear twice, can be identical to or different from each other; preferably *) are identical to each other, which is why the compounds (1) are preferably symmetrically constructed compounds.

*) those which appear twice,

Aliphatic radicals are preferably straight-chain or branched alkylene groups of 1 to 6 carbon atoms. Substituted alkyl groups are for example those which are substituted by 1 or 2 substituents from the group chlorine, alkoxy of 1 to 4 carbon atoms, benzoylamino, sulfobenzoylamino, alkanoylamino of 2 to 5 carbon atoms, hydroxy, sulfato, phosphato, alkanoyloxy of 2 to 5 carbon atoms, sulfo, carboxy or optionally substituted aryl. Preferred substituents are here the carboxy and sulfo groups as well as sulfato groups.

Aryl radicals in the groups mentioned above or hereinafter are in particular the phenyl and naphthyl radicals; they can be substituted, for example by substituents from the group alkyl of 1 to 4 carbon atoms, such as methyl and ethyl, alkoxy of 1 to 4 carbon atoms, such as methoxy and ethoxy, halogen, such as chlorine and bromine, sulfo, carboxy, nitro, sulfamoyl and carbamoyl (where sulfamoyl and carbamoyl can be monosubstituted or disubstituted by optionally substituted alkyl of 1 to 4 carbon atoms and/or optionally substituted aryl).

Preferably W or $W^1$ is an alkylene radical of 2 to 4 carbon atoms or, if interrupted by one or two hetero groups, an alkylene radical of 2 to 6, in particular 2 to 4, carbon atoms, the hetero group in the alkylene radical preferably being an oxygen atom or the group —NH— or —N(CH$_3$)—. Furthermore, W and $W^1$ are for example cycloalkylene groups of 5 or 6 carbon atoms having 1 to 3 methyl groups as substituents or two such cycloalkylene groups linked by an alkylene radical of 1 to 4 carbon atoms, or an alkylene radical of 2 to 6 carbon atoms which can be interrupted by such a cycloalkylene group.

The radicals $W^1$ are for example the 1,2-ethylene, 1,3-propylene, 1,4-butylene, 1,5-pentylene, 1,6-hexylene, 2-methyl-1,3-propylene, 1,2-dimethyl-1,2-ethylene, 1,3-dimethyl-1,3-propylene, 2,2-dimethyl-1,3-propylene or 1,2-, 1,4- and 1,3-cyclohexylene radical or a bivalent radical of the following formulae (a) to (s), of which preferably the 1,2-ethylene, 1,3-propylene and 1,4-butylene radical and the radical of the formula (a):

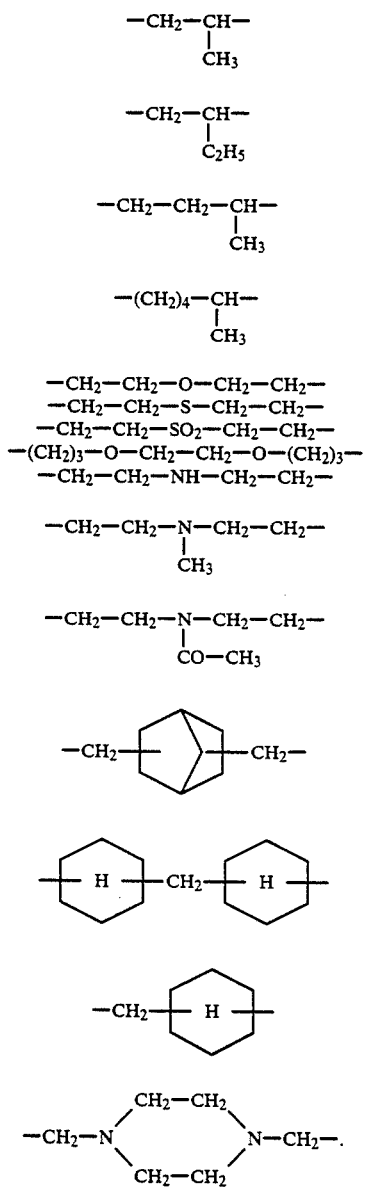

The radicals W are for example the groups just mentioned for $W^1$ but arranged as mirror images.

Heterocyclic groupings which are formed together from the formula radicals —B—$W^1$—N($R^*$)— or —N($R^*$)—W—B— are for example the bivalent 1,4-piperidino radical. Groupings with heterocyclic radicals which are formed together from the formula radical —B—$W^1$— are for example radicals of the formula (t)

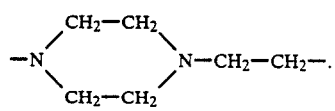

Groupings with heterocyclic radicals which are formed together from the formula radical —W—B— are for example a radical of the formula (u)

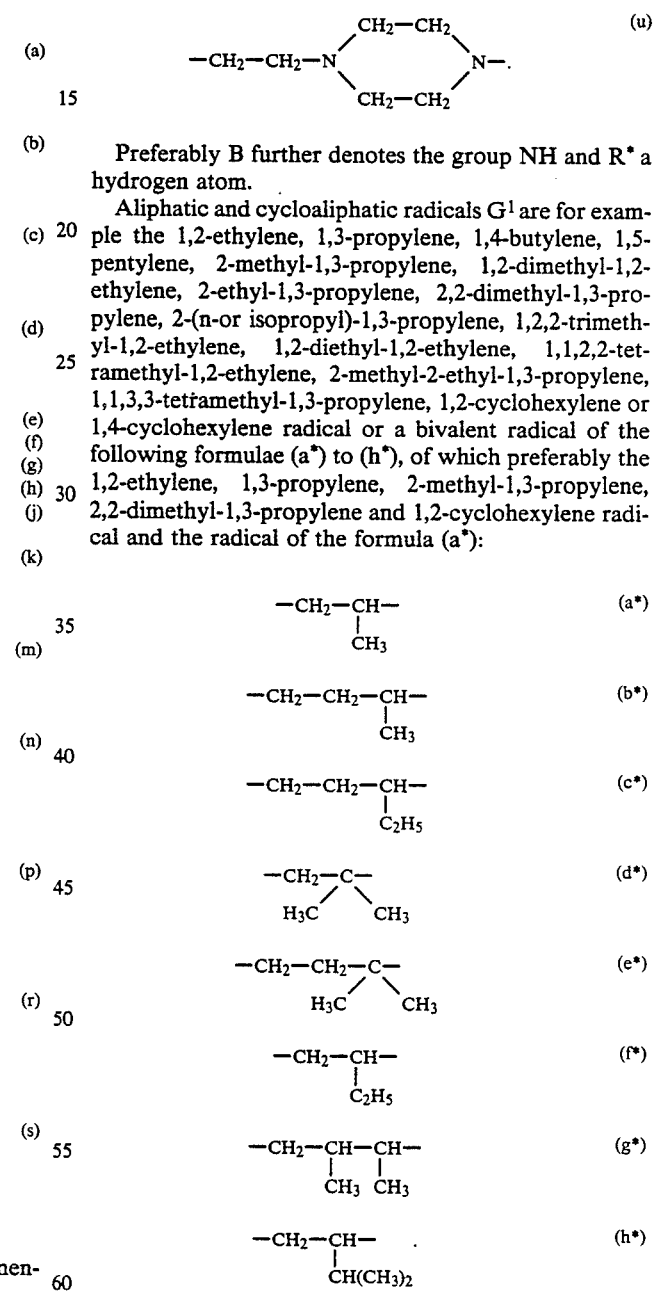

Preferably B further denotes the group NH and $R^*$ a hydrogen atom.

Aliphatic and cycloaliphatic radicals $G^1$ are for example the 1,2-ethylene, 1,3-propylene, 1,4-butylene, 1,5-pentylene, 2-methyl-1,3-propylene, 1,2-dimethyl-1,2-ethylene, 2-ethyl-1,3-propylene, 2,2-dimethyl-1,3-propylene, 2-(n-or isopropyl)-1,3-propylene, 1,2,2-trimethyl-1,2-ethylene, 1,2-diethyl-1,2-ethylene, 1,1,2,2-tetramethyl-1,2-ethylene, 2-methyl-2-ethyl-1,3-propylene, 1,1,3,3-tetramethyl-1,3-propylene, 1,2-cyclohexylene or 1,4-cyclohexylene radical or a bivalent radical of the following formulae ($a^*$) to ($h^*$), of which preferably the 1,2-ethylene, 1,3-propylene, 2-methyl-1,3-propylene, 2,2-dimethyl-1,3-propylene and 1,2-cyclohexylene radical and the radical of the formula ($a^*$):

The radicals G are for example the groups just mentioned for $G^1$ but arranged as mirror images.

Preferably the formula radicals $X^1$ and $X^2$, which are identical to or different from each other, preferably identical to each other, are each a hydrogen atom or in particular a halogen atom, such as a bromine atom and in particular a chlorine atom.

Heretofore and hereinafter, sulfo groups are groups conforming to the general formula —SO₃M, carboxy groups are groups conforming to the general formula —COOM, sulfato groups are groups conforming to the general formula —OSO₃M, thiosulfato groups are groups conforming to the general formula —S—SO₃M and phosphato groups are groups conforming to the general formula —OPO₃M₂, where M has in each case the abovementioned meaning.

The novel dioxazine compounds can be present in their acid form and in the form of their salts. Preferably they are in the form of the alkali metal salts and are also preferably used in the form of these salts for dyeing (to be understood in the general sense and as including printing) hydroxy- and/or carboxamido-containing materials, in particular fiber materials.

Preferred triphendioxazine compounds according to the invention are those of the general formula (1a)

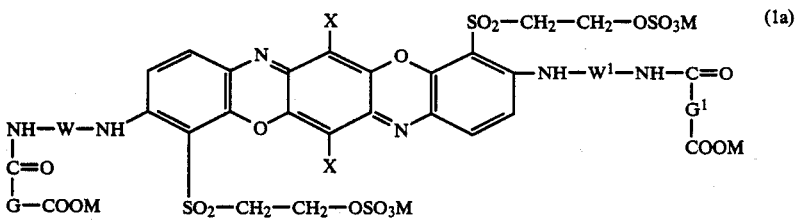

in which

W and W¹ both denote an alkylene group of 2 to 6 carbon atoms,

X stands in each case for a bromine atom or particularly preferably for a chlorine atom, M has the abovementioned meaning and is preferably an alkali metal and G and G¹ both denote an alkylene group of from 2 to 6 carbon atoms.

Preference is given in particular to compounds of the general formula (1a) in which both the Xs stand for a chlorine atom and to those in which W and W¹ both denote the 1,2-ethylene radical or 1,3-propylene radical and G and G¹ both denote the 1,2-ethylene radical.

The present invention further relates to processes for preparing the abovementioned and defined compounds of the general formula (1). These processes comprise cyclizing a compound of the general formula (2)

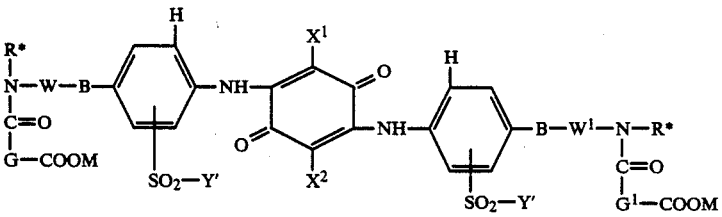

(in which Y' is the vinyl group, the β-hydroxyethyl group or an ethyl group which contains in the β-position an alkali-eliminable substituent, such as one of those mentioned for Y, preferably is the β-hydroxyethyl group, and B, G, G¹, R*, W, W¹, X¹ and X² have the abovementioned meanings, where substituted alkyl groups in these radicals can also be hydroxy-substituted alkyl groups, the groups —SO₂—Y' are preferably bonded in the ortho-position relative to the group B and the benzene nuclei must not be substituted in any of the ortho-positions relative to the indicated amino group —NH—) in an acid medium and preferably in the presence of an oxidizing agent to the triphendioxazine. The reaction is effected in a conventional manner, for example in sulfuric acid or SO₃-containing sulfuric acid as a reaction medium, the oxidizing agent used being sulfur trioxide, ammonium persulfate or alkali metal persulfates, iodine or inorganic iodine compounds in the presence of oleum, sodium perborate, but preferably sodium peroxodisulfate or potassium peroxodisulfate (conforming to the formulae Na₂S₂O₈ and K₂S₂O₈ respectively). These procedures are known for example from British Pat. No. 1,589,915 and European Patent Application Publications No. 0,141,359 A and No. 0,168,751 A.

Preferably the cyclization is carried out in concentrated sulfuric acid, such as 96 to preferably 100% strength sulfuric acid and in particular in SO₃-containing sulfuric acid (oleum), such as up 50% strength by weight oleum. The reaction temperature is chosen between 0° and 60° C. The oleum used as reaction medium and agent in general has a sulfur trioxide content of 5 to 40% by weight, preferably 10 to 20% by weight. On addition of peroxodisulfate as oxidizing agent, the cyclization is carried out between 0° and 40° C., preferably between 15° and 25° C. On using oleum/peroxodisulfate, the reaction temperature should not exceed 30° C. Preference is given to 10 to 20% strength oleum together with twice the molar amount of peroxodisulfate, relative to compound (2). In the case of iodine as oxidizing agent, the iodine is used in catalytic amounts in 10 to 50% strength oleum; in this case the reaction temperature is in general between 0° and 40° C.

Simultaneously with the cyclization or only after the cyclization reaction, any hydroxyalkyl groups present, such as, for example, the β-hydroxyethyl group of the formula radical Y', can be esterified by means of a sulfating or phosphating agent, such as 96–100% strength sulfuric acid or SO₃-containing sulfuric acid on the one hand or polyphosphoric acid on the other, into the corresponding β-sulfatoalkyl or β-phosphatoalkyl groups. If thus the ring closure is carried out in sulfuric acid or oleum as the reaction medium, hydroxy groups which are bonded to an alkyl radical of the molecule, such as, for example, the abovementioned β-hydroxyethyl groups of the formula radical Y' or hydroxyalkyl groups of the formula radicals R*, W and W¹, are converted into the corresponding sulfatoalkyl groups.

In the case of cyclization temperatures of above 15° C., in particular above 25° C., it is also possible according to the invention to use 100% strength sulfuric acid or oleum to introduce sulfo groups into the aromatic rings of the aryl radicals of R*, X¹ and X². The sulfonation reaction, however, can also be carried out after the cyclization, if desired in a separate reaction step, on the isolated cyclization product (triphendioxazine). In this case, the sulfonation reaction is carried out in general between 20° and 80° C., preferably between 30° and 70° C.

Compounds of the formula (1) where Y is equal to a β-sulfatoethyl group can subsequently be converted in a conventional manner into other compounds according to the invention of the formula (1) in which the Ys stand for vinyl groups or ethyl groups having another alkalinically eliminable substituent in the β-position.

The starting compounds of the general formula (2) can likewise be prepared in a manner according to the invention by reacting a compound of the general formula (3)

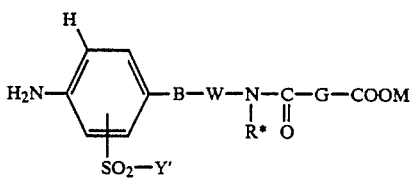
(3)

(where W also stands for W¹ and G also stands for G¹ and Y' has the abovementioned meaning and preferably is the β-hydroxyethyl group and R* and B have the abovementioned meanings, where substituted alkyl groups in these radicals can also be hydroxy-substituted alkyl groups and aryl radicals can also be free of sulfo groups and the groups —SO₂—Y' are preferably bonded in the ortho-position relative to the group B) with a 1,4-benzoquinone compound of the general formula (4)

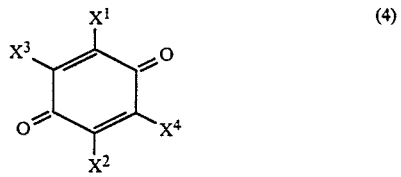
(4)

in which X¹ and X² have the abovementioned meanings and X³ and X⁴ are identical to or different from each other and each stands for a hydrogen atom, an alkoxy group of 1 to 4 carbon atoms, such as in particular the methoxy group, or for a phenoxy group or preferably is a halogen atom, such as a fluorine atom, in particular a bromine atom and especially a chlorine atom, and where X³ and X⁴ can also be identical to X¹ and X².

The reaction of a compound of the general formula (3) or of two different amino compounds of the general formula (3), in either case in, together, 2 times the equivalent amount, with one equivalent of a compound of the general formula (4) to give the compound of the general formula (2) is effected analogously to known procedures which are mentioned and described for example in European Patent Application Publications No. 0,141,996 A and No. 0,168,751 A. For example, the reaction can be carried out in an aqueous medium or in an aqueous organic medium or in a purely organic medium, the organic solvents being polar aprotic and protic solvents, such as, for example, lower alkanols, such as methanol and ethanol, and halogenated benzenes, such as o-dichlorobenzene. Preference, however, is given to using quinone (4) in a certain excess which, in general, amounts to 5 to 20%. The reaction of amines (3) with quinones (4) can be carried out at a temperature between 20° and 100° C., preferably between 50° and 70° C., in the presence of an acid-binding agent, such as, for example, an alkali or alkaline earth metal carbonate or acetate, for example sodium acetate, sodium carbonate or sodium bicarbonate, or of an alkali metal or alkaline earth metal hydroxide, such as sodium hydroxide, or of an oxide of an alkaline earth metal, such as, for example, magnesium oxide. If the reaction is carried out in an aqueous or aqueous organic medium, a pH range between 4 and 7, preferably 5.5 and 6.5, is established.

The aniline starting compounds of the general formula (3) have hitherto not been disclosed. The invention thus also relates to these compounds, to processes for the preparation thereof and to their use for synthesizing dyes. They can be prepared analogously to known procedures of reacting amino compounds with carboxylic anhydrides, for example according to the invention by reacting an amino compound of the general formula (5)

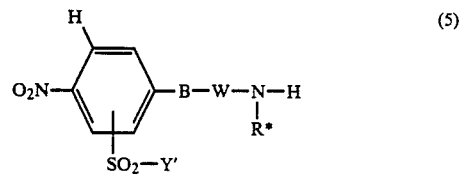
(5)

in which Y', B, W and R* have the abovementioned meanings, with an anhydride of the general formula (6) or (7)

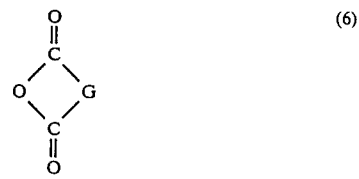
(6)

(7)

in which G has the abovementioned meaning and D denotes a bivalent, straight-chain or branched unsaturated radical of 2 to 8 carbon atoms which contains one or two double bonds, and subsequently reducing the nitro group and any olefinic bond present.

Unsaturated aliphatic radicals D are for example the radicals of the formulae

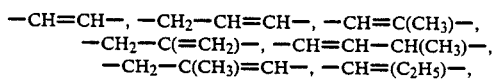

-continued

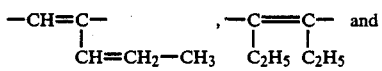

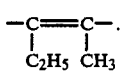

Preferably D denotes the vinylidene radical.

The reaction of the compounds of the general formula (5) with the compounds (6) or (7) is effected in accordance with the procedures described in the literature for this type of reaction, such as, for example, in an aqueous medium or in an organic medium widely used for this type of reaction, such as an alkanol of 1 to 6 carbon atoms, such as in particular methanol or ethanol, acetone, methyl ethyl ketone, dioxane, N,N-dimethylformamide, N-methylpyrrolid-2-one or toluene or a mixture of water and a water-miscible organic solvent, at a temperature between 0° and 100° C. and, if the reaction is carried out in an aqueous or aqueous organic medium, at a pH value between 2 and 10.

Carboxylic anhydrides of the general formula (6) are for example succinic anhydride*) glutaric anhydride+) adipic anhydride°) 3-methylsuccinic anhydride, 3-ethylsuccinic anhydride, 3,4-dimethylsuccinic anhydride, 3,3-dimethylsuccinic anhydride, 4-methylglutaric anhydride, 3,3-dimethylglutaric anhydride, 3,4-dimethylglutaric anhydride, 4,4-dimethylglutaric anhydride, 3-isopropylsuccinic anhydride, 3,4-diethylsuccinic anhydride, 3,3,4,4-tetramethylsuccinic anhydride, 3,3,5,5-tetramethylglutaric anhydride, 4-methyl-4-ethylglutaric anhydride and cyclohexane-1,2-dicarboxylic anhydride.

*) (ethane-dicarboxy anhydride),
+) (propane dicarboxy anhydride),
°) (butane dicarboxy anhydride), Unsaturated carboxylic anhydrides of the general formula (7) are for example maleic anhydride, 3-methylmaleic anhydride or the anhydride of prop-2-ene-1,3-dicarboxylic acid, of 2-methylprop-2-ene-1,3-dicarboxylic acid or of prop-2-ene-1,2-dicarboxylic acid.

The reactions of compounds (5) with compounds (6) and (7) respectively give the nitro compounds according to the invention, which have previously not been described in the literature and which conform to a general formula (8) or (9)

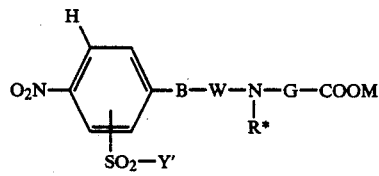

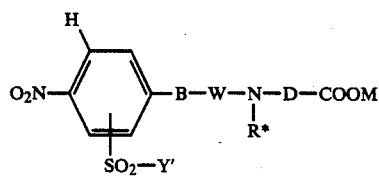

in which Y', B, W, D, G, R* and M have the abovementioned meanings, and which can then be converted by conventional methods of reducing aromatic nitro compounds into the compound of the general formula (3) by means of hydrogen over a metallic catalyst, such as a palladium, platinum or Raney nickel catalyst, under superatmospheric pressure in an autoclave or by means of a Béchamp reduction using iron chips. In the course of this conversion, the unsaturated bonds of D in the compounds (10) are also hydrogenated to form compound (3).

The starting compounds conforming to the general formula (5) are known or can be prepared analogously thereto in a conventional manner, as described for example in German Offenlegungsschrift No. 3,502,991.

Starting compounds of the general formula (3) are for example 3-(β-hydroxyethylsulfonyl)-4-N-[β-(carboxyethanecarboxamido)-ethyl]-aminoaniline, 3-(β-hydroxyethylsulfonyl)-4-N-[γ-(carboxyethanecarboxamido)-n-propyl]-aminoaniline, 3-(β-hydroxyethylsulfonyl)-4-N-[β-(carboxyethanecarboxamido)-n-propyl]-aminoaniline, 3-(β-hydroxyethylsulfonyl)-4-N-[β-(1'-carboxycyclohexane-2'-carboxamido)-n-propyl]-aminoaniline, 3-(β-hydroxyethylsulfonyl)-4-N-[β-(1'-carboxycyclohexane-2'-carboxamido)-ethyl]-aminoaniline, 3-(β-hydroxyethylsulfonyl)-4-N-{β-[β'-(carboxyethanecarboxamido)-ethoxy]-ethyl}-aminoaniline, 3-(β-hydroxyethylsulfonyl)-4-N-[β-(2'-carboxy-n-propane-1'-carboxamido)-ethyl]-aminoaniline, 3-(β-hydroxyethylsulfonyl)-4-N-{β-[β'-(carboxyethanecarboxamido)-ethylsulfonyl]-ethyl}-aminoaniline, 3-(β-hydroxyethylsulfonyl)-4-N-[β-(carboxypropanecarboxamido)-ethyl]-aminoaniline, 3-(β-hydroxyethylsulfonyl)-4-N-[γ-(carboxypropanecarboxamido)-n-propyl]-aminoaniline, 3-(β-hydroxyethylsulfonyl)-4-N-[β-(3'-carboxy-2'-methylpropane-1'-carboxamido)-ethyl]-aminoaniline, 3-(β-hydroxyethylsulfonyl)-4-N-[β-(2'-carboxy-2'-methylpropane-1'-carboxamido)-ethyl]-aminoaniline, 3-(β-hydroxyethylsulfonyl)-4-N-[γ-(2'-carboxy-2'-methylpropane-1'-carboxamido)-n-propyl]-aminoaniline, 3-(β-hydroxyethylsulfonyl)-4-N-[β-(3'-carboxy-2',2'-dimethylpropane-1'-carboxamido)-ethyl]-aminoaniline, 3-(β-hydroxyethylsulfonyl)-4-N-[γ-(1'-carboxy-cyclohexane-2'-carboxamido)-propyl]-aminoaniline and 3-(β-hydroxyethylsulfonyl)-4-N-{β-[β'-(carboxyethanecarboxamido)-N'-methyl-N'-ethyl]-ethyl}-aminoaniline.

The benzoquinones of the general formula (4) which are used as starting compounds are, for example, 2-methyl-3,5,6-tribromo-1,4-benzoquinone, 2-methoxy-3,5,6-trichloro-1,4-benzoquinone, 2,3,5,6-tetramethoxy-1,4-benzoquinone, 2,3,5,6-tetraphenoxy-1,4-benzoquinone, 2-methyl-3,6-dichloro-1,4-benzoquinone, 2,5-dichloro-1,4-benzoquinone and preferably 2,3,5,6-tetrabromo-1,4-benzoquinone and in particular 2,3,5,6-tetrachloro-1,4-benzoquinone (chloranil).

The precipitation and isolation of the compounds of the general formula (1) prepared according to the invention from the synthesis solutions can be effected by generally known methods, for example either by precipitating from the reaction medium by means of electrolytes, such as, for example, sodium chloride or potassium chloride, or by evaporating the reaction solution, for example by spray-drying, it being possible for a buffer substance to be added to this reaction solution.

The compounds according to the invention of the general formula (1)—hereinafter referred to as compounds (1)—have fiber-reactive properties and valuable dye properties. They can therefore be used for the dyeing (including printing) of natural, regenerated or synthetic hydroxy-containing and/or carboxamido-containing materials, for example in the form of sheetlike structures, such as paper or leather, or prior to forming, of polyamide or polyurethane, but in particular of such materials in fiber form, such as cellulose fiber materials, silk, wool and synthetic polyamide and polyurethane fibers. Also the solutions obtained in the synthesis of compounds (1) can be directly used as a liquid formulation in dyeing, if desired after addition of a buffer substance and also if desired after concentrating.

Compounds (1), in accordance with the use according to the invention, can be applied to and fixed on the substrates mentioned, in particular the fiber materials mentioned, by the application techniques known for water-soluble, in particular fiber-reactive, dyes, for example by applying compound (1) in dissolved form to or into the substrate and fixing it thereon or therein, if desired by the action of heat and/or if desired by the action of an alkaline agent. These dyeing and fixing methods are described in large number in the literature, including for example in European Patent Application Publication No. 0,168,751 A.

The present invention therefore also relates to the use of compounds (1) for dyeing (including printing) hydroxy-and/or carboxamido-containing materials, more specifically to a process for their application to these substrates. Preferably the materials are used in the form of fiber materials, in particular in the form of textile fibers, such as yarns, wound packages and fabrics. Here it is possible to proceed analogously to known methods of applying and fixing fiber-reactive dyes.

The dyeings and prints prepared with compounds (1) are distinguished by pure, predominantly blue hues. In particular the dyes and prints on cellulose fiber materials have very high tinctorial strengths and similarly very good light fastness properties, in particular good wet light and perspiration light fastness properties, as well as good hypochlorite bleach and chlorinated water fastness properties, and further excellent wet fastness properties, such as, for example, good wash fastness properties at 60° to 95° C., even in the presence of perborates, acid and alkaline fulling, cross-dyeing and perspiration fastness properties, alkali, acid, water and seawater fastness properties, as well as a good pleating fastness, hot press fastness and crock fastness. They similarly have a good wet storage fastness and a very good resistance to acid fading on storage of moist dyed material which still contains acetic acid. Furthermore, the dyeings are stable to the customary synthetic resin finishes. Some of compounds (1) are comparable in purity of the hue and in important fastness properties to fiber-reactive anthraquinone dyes.

The following Examples serve to illustrate the invention. The parts and percentages are by weight, unless otherwise stated. Parts by weight relate to parts by volume as the kilogram relates to the liter.

The compounds described in these Examples in terms of formulae are shown in the form of free acids; in general they are prepared and isolated in the form of their sodium or potassium salts and used for dyeing in the form of their salts. In a similar way, the starting compounds and components mentioned in the following Examples, in particular the tabulated Examples, in the form of the free acid can be used in the synthesis as such or in the form of their salts, preferably alkali metal salts, such as sodium or potassium salts. The absorption maxima ($\lambda_{max}$ values) were determined in aqueous solution. The $^1$H-NMR measurements were carried out in $d_6$-dimethyl sulfoxide using tetramethylsilane as internal standard, unless otherwise stated.

EXAMPLE 1

(a) To a warm suspension at 60° C. of 14.4 parts of 4-(β-aminoethylamino)-3-(β-hydroxyethylsulfonyl)-nitrobenzene in 100 parts of water is added slowly, in the course of 15 minutes, a solution of 5.4 parts of maleic anhydride in 15 parts of acetone. This is followed by 20 minutes of stirring at 60° C., the batch is then allowed to cool down, and the precipitated product is filtered off with suction and dried under reduced pressure at 60° C.

It has the following analytical data:
Melting point: 175° C.;

Elemental analysis (calculated for $C_{14}H_{17}N_3O_8S$ and molecular weight=387.3): calculated: C 43.4%, H 4.4%, N 10.8%, found: C 43.4%, H 4.3%, N 10.8%;

$^1$H-NMR spectroscopy: δ=3.41 ppm (m,2H), 3.49 ppm (m,2H), 3.53 ppm (t,2H), 3.71 ppm (t,2H), 4.83 ppm (s,OH), 6.21 ppm (d,1H), 6.35 ppm (d,1H), 7.08 ppm (d,1H), 7.30 ppm (t,NH), 8.24 ppm (dd,1H), 8.40 ppm (d,1H), 8.99 ppm (t,NH), 14.15 ppm (s,OH).

The compound has the following structure:

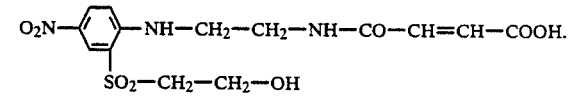

(b) To a warm suspension of 40° C. of 60 parts of 4-(β-aminoethylamino)-3-(β-hydroxyethylsulfonyl)-nitrobenzene in 200 parts of water is added slowly, in the course of 15 minutes, a solution of 22 parts of succinic anhydride in 40 parts of acetone. The batch is subsequently stirred at 40° C. for 30 minutes and then allowed to cool down; the precipitated product is filtered off with suction and dried.

It has the following analytical data:
Melting point: 143°–145° C.;

Elemental analysis (calculated for $C_{14}H_{19}N_3O_8S$ and molecular weight=389.4): calculated: C 43.1%, H 4.9%, N 10.8%, found: C 43.1%, H 5.0%, N 10.5%;

$^1$H-NMR spectroscopy: δ=2.32 ppm (t,2H), 2.42 ppm (t,2H), 3.28 ppm (m,2H), 3.43 ppm (m,2H), 3.50 ppm (t,2H), 3.72 ppm (t,2H), 7.08 ppm (d,1H), 7.28 ppm (t,NH), 8.09 ppm (t,NH), 8.27 ppm (dd,1H), 8.40 ppm (d,1H); the protons of COOH and OH were not visible.

The compound has the following structure:

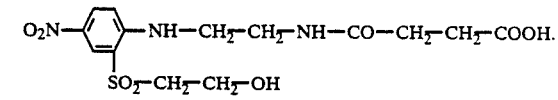

(c) 39 parts of the nitro compound of (a) or of (b) are dissolved in 200 parts by volume of methanol and hydrogenated in an autoclave at a temperature of up to 80° C. and a pressure of 50 bar in the presence of a palladium catalyst. The hydrogenation time is about 4 hours. The catalyst is then filtered off and the filtrate is concentrated by distilling off the solvent and freed therefrom. The desired compound of the formula

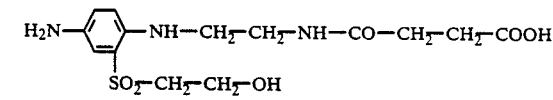

is obtained in the form of an oil.

The compound has the following ¹H-NMR spectroscopy data: δ=2.32 ppm (t,2H), 2.40 ppm (t,2H), 3.81 ppm (m,2H), 3.25 ppm (m,2H), 3.35 ppm (t,2H), 3.67 ppm (t,2H), 5.42 ppm (s,NH), 6.72 ppm (d,1H), 6.85 ppm (dd,1H), 6.95 ppm (d,1H), 8.03 ppm (s,NH); the protons of COOH, NH₂ and OH were not visible.

EXAMPLE 2

(a) To synthesize the precursor according to the invention 3-(β-hydroxyethylsulfonyl)-4-N-[γ-(maleic acid-monoamido)-n-propylamino]-nitrobenzene, the procedure of Example (1a) is followed, except that the 4-(β-aminoethylamino)-3-(β-hydroxyethylsulfonyl)-nitrobenzene is replaced by the equivalent amount of 4-(γ-amino-n-propylamino)-3-(β-hydroxyethylsulfonyl)-nitrobenzene.

The compound obtained has the following analytical data:

Melting point: 154°–156° C.;

¹H-NMR spectroscopy: δ=1.78 ppm (m,2H), 3.26 ppm (m,2H), 3.42 ppm (m,2H), 3.5 ppm (t,2H), 3.72 ppm (t,2H), 4.91 ppm (s,OH), 6.21 ppm (d,1H), 6.40 ppm (d,1H), 7.02 ppm (d,1H), 7.28 ppm (t,NH), 8.23 ppm (dd,1H), 8.41 ppm (d,1H), 9.00 ppm (t,NH); the proton of the COOH group was not visible.

The compound has the following structure:

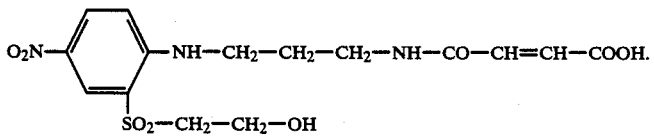

(b) The precursor according to the invention, which is saturated in the aliphatic carboxylic acid portion and is analogous to (a), namely 3-(β-hydroxyethylsulfonyl)-4-N-[γ-(carboxyethanecarboxamido)-n-propylamino]-nitrobenzene, can be prepared analogously to the procedure of Example (1b) by replacing the starting compound thereof, namely 4-(β-aminoethylamino)-3-(β-hydroxyethylsulfonyl)-nitrobenzene, by the equivalent amount of 4-(γ-amino-n-propylamino)-nitrobenzene.

The compound has the following analytical data:

Melting point: 142°–144° C.;

¹H-NMR spectrocopy: δ=1.69 ppm (m,2H), 2.32 ppm (t,2H), 2.42 ppm (t,2H), 3.18 ppm (m,2H), 3.37 ppm (m,2H), 3.52 ppm (t,2H), 3.62 ppm (t,2H), 6.98 ppm (d,1H), 7.25 ppm (t,NH), 7.82 ppm (t,NH), 8.22 ppm (dd,1H), 8.39 ppm (d,1H); the protons of COOH and OH were not visible.

The compound has the following structure:

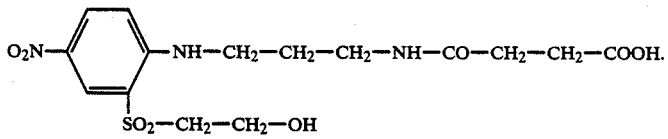

(c) The nitro compound described in (a) as well as that described in (b) can be reduced in accordance with the directions of Example (1c) to the amino compound of the formula

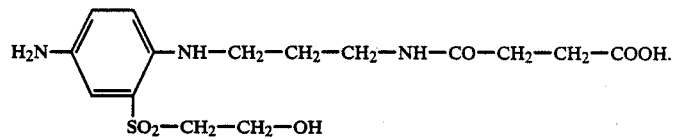

This aniline derivative is obtained in the form of an oil.

It has the following ¹H-NMR spectroscopy data: δ=1.62 ppm (m,2H), 2.25 ppm (t,2H), 2.40 ppm (t,2H), 3.03 ppm (m,2H), 3.06 ppm (m,2H), 3.34 ppm (t,2H), 3.63 ppm (t,2H), 5.32 ppm (s,NH), 6.66 ppm (d,1H), 6.82 ppm (dd,1H), 6.92 ppm (d,1H), 7.89 ppm (t,NH); further protons were not visible.

EXAMPLE 3

To prepare a triphendioxazine compound according to the invention, the starting point is an aqueous solution of pH 6.0 of 54 parts of the aniline compound described in Example (1c) in 500 parts of water. This solution is heated to 60° C., and at that temperature a total of 19 parts of chloranil are added a little at a time while a pH value between 6.0 and 6.5 is maintained. The batch is subsequently stirred for 3 hours, and the precipitated product is filtered off with suction, washed with a little water and dried under reduced pressure at 80° C.

The quinoidal condensation product obtained has the following ¹H-NMR spectroscopy data: δ=2.32 ppm (t,4H), 2.45 ppm (t,4H), 3.28 ppm (m; number of protons not determinable, since signal hidden by signal of small amounts of H₂O); 3.38 ppm (t,4H), 3.65 ppm (t,4H), 4.80 ppm (s,OH), 6.25 ppm (s,NH), 6.9 ppm (d,2H), 7.34 ppm (m,4H), 8.08 ppm (s,NH), 9.61 ppm (s,NH), 11.9 ppm (s,OH).

To cyclize this condensation product to the triphendioxazine compound, 23 parts of this product are gradually added at 20° C. to 220 parts of 10% strength oleum, and the mixture is subsequently stirred until solution is complete. 11.5 parts of sodium peroxodisulfate are then gradually added while a reaction temperature of 20° to 25° C. is maintained, the batch is subsequently stirred for one hour and then discharged onto ice, the suspension is brought with calcium carbonate to pH 1–1.5, sodium carbonate is added up to a pH value of 5.5, the calcium sulfate is filtered off and washed with water, and the filtrates are combined. The compound according to the invention can be obtained therefrom by evaporating or spray-drying. However, the workup can also be effected by taking up the compound according to the invention, which on addition of the cyclization batch to ice precipitated in its acid form, again in water, adjusting the pH with sodium carbonate to a value of 5.5, and isolating the compound according to the invention in the form of alkali metal salt (sodium salt) by evaporating or spray-drying.

This gives the alkali metal (sodium) salt according to the invention of the compound of the formula tion of the aniline compound of Example (2c) is prepared analogously to the directions of Example 3 using equivalent amounts, and this aniline compound is reacted with chloranil, and the precipitated quinoidal condensation product is filtered off with suction, washed with a little water, dried and then added at 20° C. to 10% strength oleum. As in Example 3, the cyclization reaction is speeded up by means of sodium peroxodisulfate. On completion of the cyclization and after addition of calcium carbonate and removal of calcium sulfate by filtration and bringing the resulting filtrate to pH 6, the triphendioxazine compound according to the

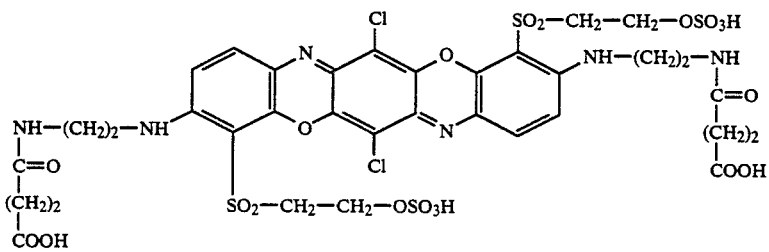

in the form of a powder which contains electrolyte salt (predominantly sodium sulfate); the respective $\beta$-sulfatoethylsulfonyl group can also be bonded in the other ortho-position relative to the amino group, but is more likely to be in the position shown in the above formula.

This compound according to the invention has very good fiber-reactive dye properties ($\lambda_{max}$=612 nm). It dyes the materials mentioned in the description, in particular cellulose fiber materials, such as cotton, by the industrially customary and known procedures of applying and fixing fiber-reactive dyes in strong, pure blue shades having good fastness properties, such as in particular good light fastness of the dry or moist, such as tap-water-moistened dyeings, good alkaline perspiration light fastness, chlorinated water fastness, hypochlorite fastness, alkaline perspiration fastness, wash fastness, wet storage fastness and fastness to acid fading.

EXAMPLE 4

To prepare a triphendioxazine compound accoridng to the invention, a weakly acid to neutral aqueous soluinvention is isolated in the form of an alkali metal salt by evaporating or spray-drying. Written in the form of the free acid, it has the formula

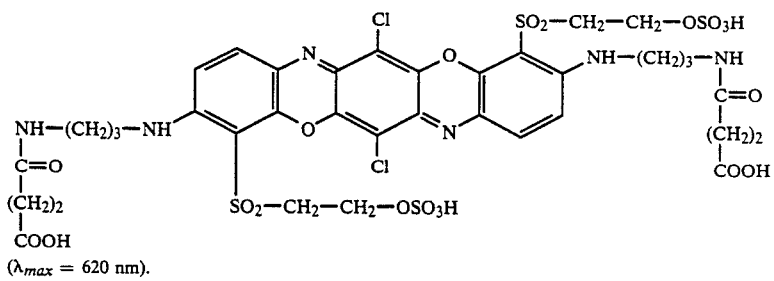

($\lambda_{max}$ = 620 nm).

The compound according to the invention has very good fiber-reactive dye properties and dyes the materials mentioned in the description, in particular cellulose fiber materials, such as cotton, by the industrially customary and known procedures of applying the fixing fiber-reactive dyes in strong, pure blue shades having good fastness properties, such as in particular good light fastness of the dry or moist, such as tapwater-moistened, dyeing, good alkaline perspiration light fastness, chlorinated water fastness, hypochlorite fastness, alkaline perspiration fastness, wash fastness, wet storage fastness and fastness to acid fading.

EXAMPLES 5 TO 23

The tabulated Examples below describe further triphendioxazine compounds according to the invention with the aid of the formula members of the general formula (A)

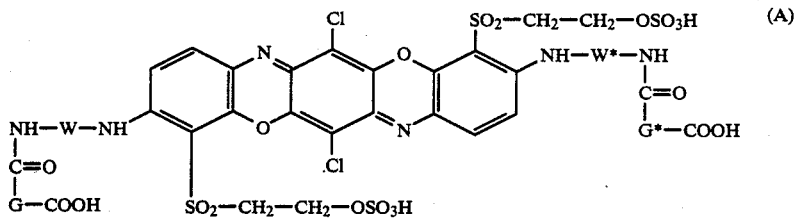

where W represents the radical of W* described in mirror image form in the table and G represents the radical of G* described there in mirror image form.

These compounds according to the invention can be prepared in a manner according to the invention, for example analogously to the above worked Example, from the evident components (chloranil, a compound of the general formula (3a) below and sulfuric acid or oleum).

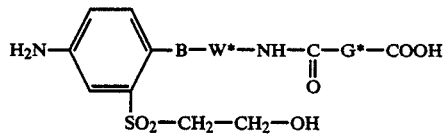

The triphendioxazine compounds according to the invention likewise have very good fiber-reactive dye properties and produce, in particular on cellulose fiber materials, strong dyes and prints having good fastness properties in the hue indicated in the respective tabulated Example.

| Example | Radical —W*— | Radical —G*— | Hue |
|---|---|---|---|
| 5 | —CH$_2$—CH(CH$_3$)— | 1,2-ethylene | blue |
| 6 | —(CH$_2$)$_2$—SO$_2$—(CH$_2$)$_2$— | " | blue |
| 7 | —(CH$_2$)$_2$—N—(CH$_2$)$_2$—<br>\|<br>CH$_3$ | " | blue |
| 8 | 1,2-ethylene | —CH$_2$—CH(CH$_3$)— | blue |
| 9 | 1,3-propylene | " | blue |
| 10 | 1,2-ethylene | 1,3-propylene | blue |
| 11 | 1,3-propylene | " | blue |
| 12 | —CH$_2$—CH(CH$_3$)— | " | blue |
| 13 | 1,2-ethylene | 2-methyl-1,3-propylene | blue |
| 14 | 1,2-ethylene | —CH$_2$C(CH$_3$)$_2$— | blue |
| 15 | 1,3-propylene | " | blue |
| 16 | —CH$_2$—CH(CH$_3$)— | " | blue |
| 17 | 1,2-ethylene | 2,2-dimethyl-1,3-propylene | blue |
| 18 | 1,3-ethylene | 2-methyl-2-ethyl-1,3-propylene | blue |
| 19 | 1,2-ethylene | 1,2-cyclohexylene | blue |
| 20 | —CH$_2$—CH(CH$_3$)— | " | blue |
| 21 | 1,3-propylene | " | blue |
| 22 | 2-methyl-1,3-propylene | 1,4-ethylene | blue |
| 23 | —(CH$_2$)$_2$—O—(CH$_2$)$_2$— | " | blue |

We claim:
1. A compound of the formula

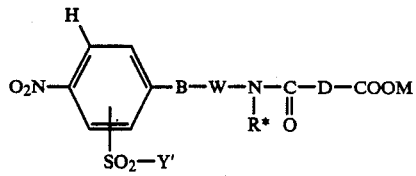

in which
B is an oxygen or sulfur or amino group or the formula —NH— or —N(R')—, in which R' is alkyl of 1 to 6 carbon atoms;
R* is hydrogen or alkyl of 1 to 4 carbon atoms unsubstituted or substituted by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms, phenyl or alkyl of 1 to 4 carbon atoms and phenyl; and naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl; or
R* is phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl, or R* is naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl;

W is a bivalent group selected from an aliphatic group or a ($C_5$–$C_{10}$)-cycloaliphatic group unsubstituted or substituted by $C_1$–$C_4$-alkyl, or from an aliphatic-($C_5$–$C_8$)-cycloaliphatic group unsubstituted or substituted by $C_1$–$C_4$-alkyl in the cycloaliphatic moiety and unsubstituted or substituted in the aliphatic moiety by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms, phenyl or alkyl of 1 to 4 carbon atoms and phenyl;

or from those groups which aliphatic radicals are interrupted by hetero groups which are selected from the groups —O—, —S—, —SO$_2$—, —CO—, 1,4-piperidino, —NH— and —N(R°)—, wherein R° has one of the meanings of R' or is an alkanoyl of 2 to 5 carbon atoms;

D is a straight-chain or branched alkenylene of 2 to 8 C-atoms or an alk-dien-ylene of 4 to 8 C-atoms, and Y' is vinyl, or is an ethyl substituted by an alkali-eliminable substituent in the β-position, or is β-hydroxyethyl, and M is hydrogen, an alkali metal or one equivalent of an alkaline earth metal.

2. A compound of the formula

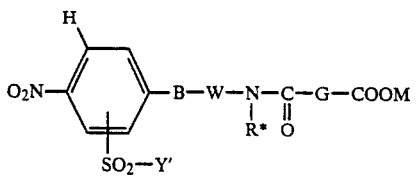

in which

B is an oxygen or sulfur or an amino group or the formula —NH— or —N(R')—, in which R' is alkyl of 1 to 6 carbon atoms;

R* is hydrogen or alkyl of 1 to 4 carbon atoms unsubstituted or substituted by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms, phenyl or alkyl of 1 to 4 carbon atoms and phenyl; and naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl; or R* is phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl, or R* is naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl;

W is a bivalent group selected from an aliphatic group or a ($C_5$–$C_{10}$)-cycloaliphatic group unsubstituted or substituted by $C_1$–$C_4$-alkyl, or from an aliphatic-($C_5$–$C_8$)-cycloaliphatic group unsubstituted or substituted by $C_1$–$C_4$-alkyl in the cycloaliphatic moiety and unsubstituted or substituted in the aliphatic moiety by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms, phenyl or alkyl of 1 to 4 carbon atoms and phenyl;

or from those groups which aliphatic radicals are interrupted by hetero groups which are selected from the groups —O—, —S—, —SO$_2$—, —CO—, 1,4-piperidino, —NH— and —N(R°)—, wherein R° has one of the meanings of R' or is an alkanoyl of 2 to 5 carbon atoms;

G is a straight-chain or branched alkylene of 1 to 8 carbon atoms or an aliphatic-cycloaliphatic group or a cycloaliphatic group the cycloaliphatic radicals being in each case those of 5 to 8 carbon atoms, Y' is vinyl, or is an ethyl substituted by an alkali-eliminable substituent in the β-position, or is β-hydroxyethyl, and M is hydrogen, an alkali metal or one equivalent of an alkaline earth metal.

3. A compound of the formula

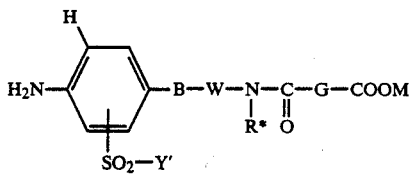

in which

B is an oxygen or sulfur or an amino group or the formula —NH— or —N(R')—, in which R' is alkyl of 1 to 6 carbon atoms;

R* is hydrogen or alkyl of 1 to 4 carbon atoms unsubstituted or substituted by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms, phenyl or alkyl of 1 to 4 carbon atoms and phenyl; and naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl; or R* is phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl, or R* is naphthyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms or phenyl or alkyl of 1 to 4 carbon atoms and phenyl;

W is a bivalent group selected from an aliphatic group or a ($C_5$-$C_{10}$)-cycloaliphatic group unsubstituted or substituted by $C_1$-$C_4$-alkyl, or from an aliphatic-($C_5$-$C_8$)-cycloaliphatic group unsubstituted or substituted by $C_1$-$C_4$-alkyl in the cycloaliphatic moiety and unsubstituted or substituted in the aliphatic moiety by one or two substituents selected from the group consisting of: chlorine; alkoxy of 1 to 4 carbon atoms; benzoylamino; sulfobenzoylamino; alkanoylamino of 2 to 5 carbon atoms; hydroxy; sulfato; phosphato; alkanoyloxy of 2 to 5 carbon atoms; sulfo; carboxy; phenyl unsubstituted or substituted by substituents selected from the group consisting of alkyl of 1 to 4 carbon atoms, alkoxy of 1 to 4 carbon atoms, halogen, sulfo, carboxy, nitro, sulfamoyl unsubstituted or monosubstituted or disubstituted by alkyl of 1 to 4 carbon atoms, phenyl or alkyl of 1 to 4 carbon atoms and phenyl, and carbamoyl unsubstituted or monosubstituted or disubstituted by alkyl of 1 to 4 carbon atoms, phenyl or alkyl of 1 to 4 carbon atoms and phenyl;

or from those groups which aliphatic radicals are interrupted by hetero groups which are selected from the groups —O—, —S—, —SO$_2$—, —CO—, 1,4-piperidino, —NH— and —N(R°)—, wherein R° has one of the meanings of R' or is an alkanoyl of 2 to 5 carbon atoms, G is a straight-chain or branched alkylene of 1 to 8 carbon atoms or an aliphatic-cycloaliphatic group or a cycloaliphatic group the cycloaliphatic radicals being in each case those of 5 to 8 carbon atoms, Y' is vinyl, or is an ethyl substituted by an alkali-eliminable substituent in the β-position, or is β-hydroxyethyl, and M is hydrogen, an alkali metal or one equivalent of an alkaline earth metal.

4. A compound according to claim 1, wherein B is the group —NH—.

5. A compound according to claim 1, wherein Y' is β-hydroxyethyl or β-sulfatoethyl.

6. A compound according to claim 2, wherein B is the group —NH—.

7. A compound according to claim 2, wherein Y' is β-hydroxyethyl or β-sulfatoethyl.

8. A compound according to claim 3, wherein B is the group —NH—.

9. A compound according to claim 3, wherein Y' is β-hydroxyethyl or β-sulfatoethyl.

10. A compound according to claim 3, wherein G is alkylene of 2 to 6 carbon atoms or cyclohexylene.

11. A compound according to claim 2, wherein G is alkylene of 2 to 6 carbon atoms or cyclohexylene.

* * * * *